United States Patent
Agrawal et al.

(10) Patent No.: US 11,656,832 B1
(45) Date of Patent: May 23, 2023

(54) DISPLAY OF DIRECTIONS FOR CONFIGURING MECHANICALLY ADJUSTABLE DISPLAY SCREEN

(71) Applicant: International Business Machines Corporation, Armonk, NY (US)

(72) Inventors: Tushar Agrawal, West Fargo, ND (US); Thomas Jefferson Sandridge, Tampa, FL (US); Sarbajit K. Rakshit, Kolkata (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/647,221

(22) Filed: Jan. 6, 2022

(51) Int. Cl.
  *G06F 3/14* (2006.01)
  *G09G 3/00* (2006.01)

(52) U.S. Cl.
  CPC ........... *G06F 3/1446* (2013.01); *G09G 3/035* (2020.08); *G09G 2300/026* (2013.01); *G09G 2354/00* (2013.01)

(58) Field of Classification Search
  CPC ..... G06F 3/1446; G06F 1/1652; G09G 3/035; G09G 2300/026; G09G 2354/00; G09G 5/38; G09F 9/3026; G09F 9/33; H04M 1/72403; G06V 40/30; H04N 21/431; H04N 21/4622; H05K 7/1452
  See application file for complete search history.

(56) References Cited

U.S. PATENT DOCUMENTS

| | | | |
|---|---|---|---|
| 9,760,124 B1 * | 9/2017 | Johnson | G06V 40/30 |
| 10,827,633 B2 | 11/2020 | Yoo | |
| 2005/0178034 A1 * | 8/2005 | Schubert | G09F 9/33 40/605 |
| 2014/0226275 A1 * | 8/2014 | Ko | G06F 1/1652 361/679.27 |
| 2016/0034240 A1 * | 2/2016 | Kreiner | G09F 9/3026 348/383 |
| 2016/0098063 A1 * | 4/2016 | Lee | G09G 5/38 345/173 |
| 2017/0322597 A1 | 11/2017 | Lee | |
| 2017/0359916 A1 * | 12/2017 | Hochman | H05K 7/1452 |

(Continued)

FOREIGN PATENT DOCUMENTS

| | | |
|---|---|---|
| CN | 105324807 B | 2/2016 |
| KR | 101843874 B1 | 3/2018 |
| WO | 2020061780 A1 | 4/2020 |

OTHER PUBLICATIONS

"Foldable Display Market—Forecasts from 2020 to 2025", Research and Markets, downloaded from the Internet on Jun. 23, 2021, <https://www.researchandmarkets.com/reports/5174315/foldable-display-market-forecasts-from-2020-to>, 4 pages.

*Primary Examiner* — Richard J Hong

(74) *Attorney, Agent, or Firm* — David B. Woycechowsky

(57) ABSTRACT

Computer implemented methods involving mechanical configuration of a mechanically configurable display device, with the methods variously involving, more specifically: (i) providing instructions for an optimal mechanical configuration; (ii) determining what content objects (for example, text portions, graphic images) can be displayed on a given mechanical configuration; and/or (iii) determining which computer programs (for example, apps) are compatible with the various possible configurations of the display device.

18 Claims, 9 Drawing Sheets

(56) References Cited

U.S. PATENT DOCUMENTS

| | | | |
|---|---|---|---|
| 2018/0039472 A1* | 2/2018 | Kreiner | ................ H04N 21/431 |
| 2018/0367736 A1 | 12/2018 | Lombardi | |
| 2019/0018638 A1* | 1/2019 | Kreiner | ............. H04N 21/4622 |
| 2019/0311692 A1 | 10/2019 | Shai | |
| 2020/0128116 A1 | 4/2020 | Jang | |
| 2020/0371564 A1 | 11/2020 | Kim | |
| 2022/0206735 A1* | 6/2022 | Zhao | ................ H04M 1/72403 |

* cited by examiner

DISPLAY OF DIRECTIONS FOR CONFIGURING MECHANICALLY ADJUSTABLE DISPLAY SCREEN

BACKGROUND

The present invention relates generally to the field of "mechanically configurable computer displays." As the term is used herein, a mechanically configurable computer display is any computer display that can be configured to have different sizes and/or shapes for the display surface by folding, flexing, rolling (that is, imparting curvature to the display surface) and/or assembled from multiple pieces (herein referred to as "display surface modules" or "DSMs").

As of 22 Nov. 2021, the Wikipedia entry for "foldable smartphone" states, in part, as follows: "A foldable smartphone (also known as a foldable phone or simply foldable) is a smartphone with a folding form factor. Some variants of the concept use multiple touchscreen panels on a hinge, while other designs utilize a flexible display . . . the first commercially available folding smartphones with OLED displays began to emerge in November 2018. Some devices may fold out on a vertical axis to into a wider, tablet-like form, but are still usable in a smaller, folded state; the display may either wrap around to the back of the device when folded . . . or use a booklet-like design where the larger, folded screen is located on the interior, and a screen on its "cover" allows the user to interact with the device without opening it . . . Horizontally-folding smartphones have also been produced, typically using a clamshell form factor . . . In 2006, Polymer Vision showed a roll-able concept and a foldable smartphone . . . In 2008, Nokia presented animated concepts of a flexible device . . . which had a tri-fold design that could be bended into various forms, such as a large, unfolded device, a feature phone-sized unit, and a smart wristband . . . [Another] dual-touchscreen Android smartphone . . . featured a pair of 3.5-inch touchscreens. When folded, the top screen continued to face the user while covering the secondary screen. Two individual apps could be shown on the displays, a single app could span across them, while specific apps also featured 'optimized' two-pane layouts. [Another smartphone has a] secondary screen [that can be] be folded behind the phone. The camera rotated with the screen so that the same sensor could face both forward and rear . . . The development of thin, flexible OLED displays enabled the possibility for new designs and form factors . . . One such concept was a smartphone that could fold outward into a single, uninterrupted tablet-sized display. [Another smartphone features] a single 7.8-inch display that folds outwards, leaving the display exposed when folded. [An industry executive] stated that the next version of the platform would provide enhancements and guidance relevant to folding devices . . ." (footnotes omitted)

SUMMARY

According to an aspect of the present invention, there is a method, computer program product and/or system that performs the following operations (not necessarily in the following order): (i) receiving a display characteristics data set including information indicative of a size and shape of a planned display that is planned to be displayed to a user through a mechanically configurable computer display device (MCCDD); (ii) determining, by machine logic, an optimal mechanical configuration for the MCCDD based upon the display characteristics data set; and (iii) communicating, to the user, configuration instructions for configuring the MCCDD into the optimal mechanical configuration.

According to an aspect of the present invention, there is a method, computer program product and/or system that performs the following operations (not necessarily in the following order): (i) receiving a displayable content universe data set including information indicative of a plurality of content objects that may be displayed to a user through a mechanically configurable computer display device (MCCDD); (ii) receiving an MCCDD data set that indicates a current mechanical configuration of the MCCDD; and (iii) determining, by machine logic and based on the displayable content universe data set and the MCCDD data set, a displayable content subset data set including information indicative of a subset of content objects that may be shown at the same time on the MCCDD in the current mechanical configuration.

According to an aspect of the present invention, there is a method, computer program product and/or system that performs the following operations (not necessarily in the following order): (i) receiving a programs data set including information indicative of a plurality of computer programs that may be run by a user; (ii) receiving a mechanical configuration data set including information indicative of an identity of a mechanically configurable computer display device (MCCDD) being used by the user and a plurality of possible mechanical configurations into which the MCCDD can be configured; and (iii) determining a programs subset data set including information indicative of a subset of computer program(s) that are compatible with at least one of the plurality of possible mechanical configurations of the MCCDD.

DETAILED DESCRIPTION

Figure 1:
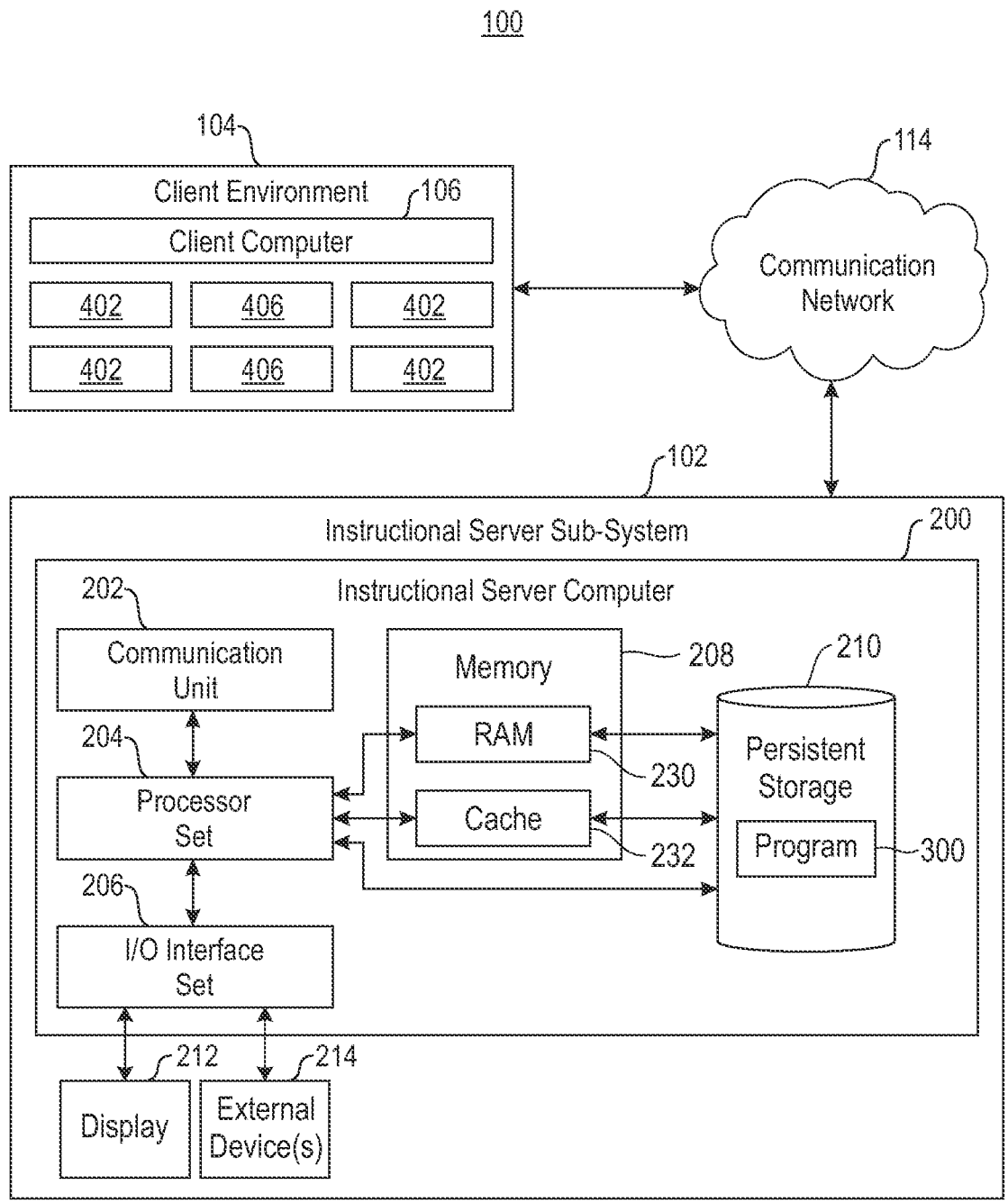
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: instructional server subsystem 102 (sometimes herein referred to, more simply, as subsystem 102); client environment 104 (including client computer 106, display surface modules (DSMs) 402 (4 pieces) and 406 (two pieces)); and communication network 114. Instructional server subsystem 102 includes: instructional server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
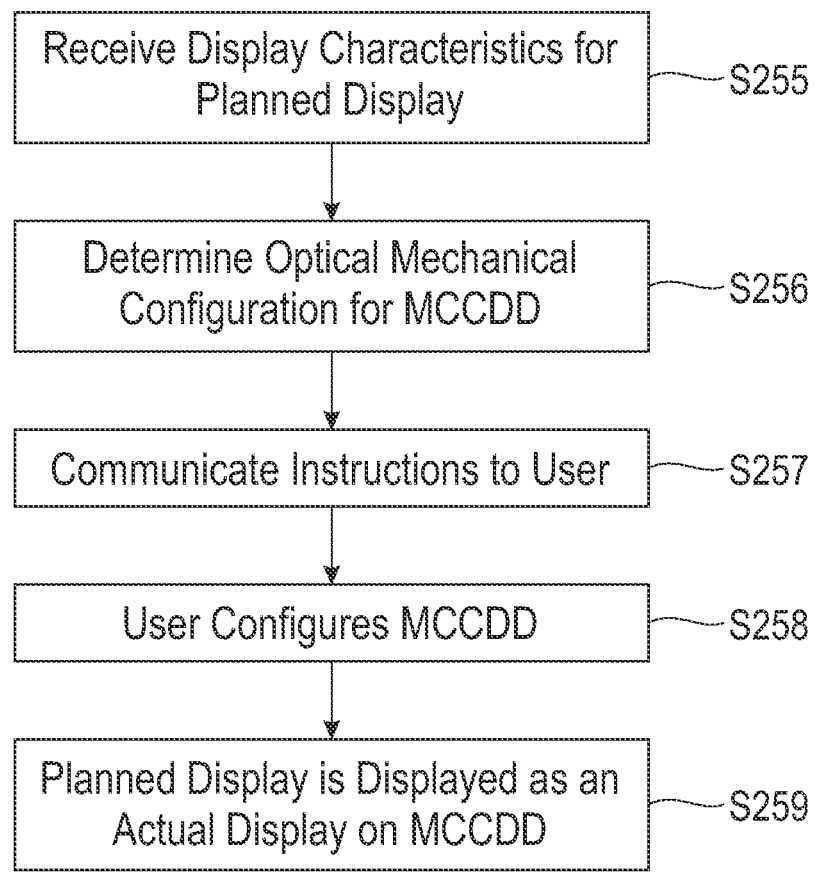
FIG. 2 is a flowchart showing a first embodiment method performed, at least in part, by the first embodiment system.
Figure 3:
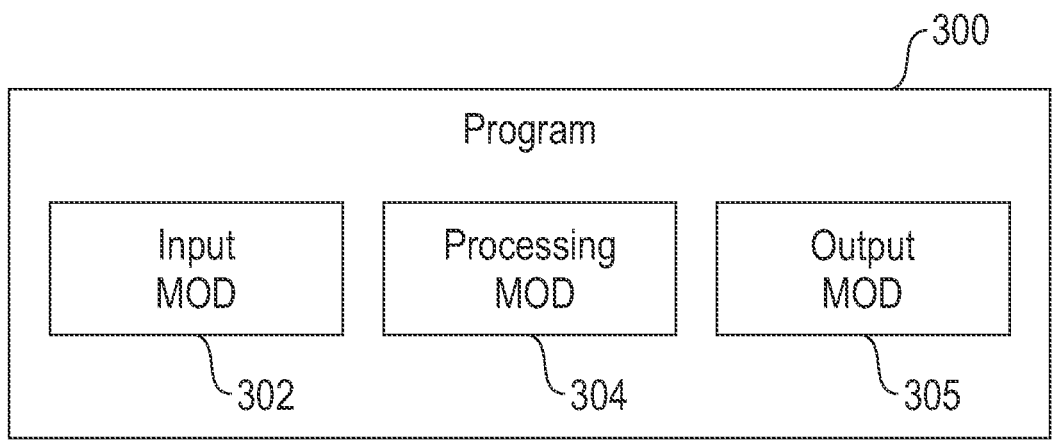
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation 5255, where input module ("mod") 302 receives, from client computer 106 and through network 114, a display characteristics data set. The display characteristics data set includes information indicative of a size and shape of a planned display. The planned display is planned to be displayed to a user through a mechanically configurable computer display device (MCCDD). As will be discussed in detail below, this MCCDD will be assembled by the user from DSMs 402 (four pieces) and 406 (two pieces). In this simple example, the size and shape of the planned display is specified in the display characteristics data set that is received from client computer 106. Alternatively, the size and shape of the planned display may be less directly indicated by other data, such as: (i) an identity of a computer program that is planned to be run, with the planned display being a display that will be generated and presented in connection with running the computer program; and/or (ii) a set of content objects (that is, pieces of text and/or images) that are planned to be included in the planned display.

Processing proceeds to operation 5256, where processing mod 304 determines an optimal mechanical configuration for the MCCDD, to be configured from DSMs 402, 406, based upon the size and shape of the planned display indicated by the display characteristics data set previously received at operation 5255.

Figure 4A:
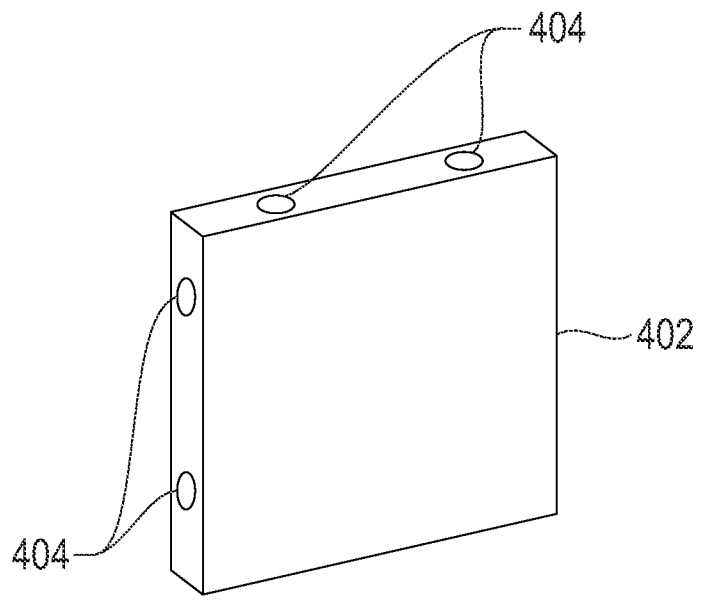
FIGS. 4A to 4H each show a perspective view of a display surface module ("DSM"), a sub-assembly of DSMs or a fully assembled display constituted by DSMs.
Figure 4B:
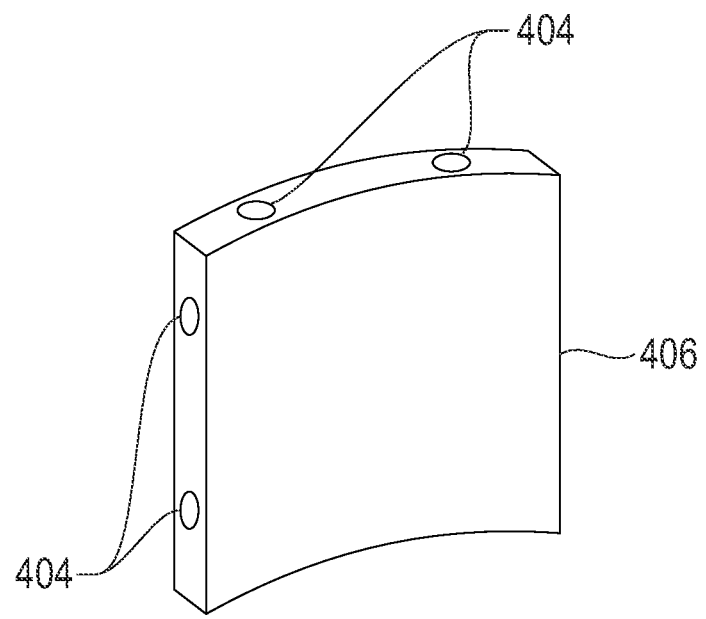

Processing proceeds to operation 5257, where output mod 305 communicates, to client computer 106 and its user (not shown in FIG. 1), configuration instructions for configuring the MCCDD into the optimal mechanical configuration. In this example, the mechanically configurable display device is to be configured by mechanically assembling display surface modules (DSMs), specifically DSMs 402 (four pieces) and DSMs 406 (two pieces). One of the DSM 402 type pieces is shown in FIG. 4A and includes connector portions 404 for connecting the various DSMs to each other. One of the DSM 406 type pieces is shown in FIG. 46 and also includes connector portions 404 for connecting the various DSMs to each other. In this embodiment, the display is mechanically configured by assembling the separate DSM pieces to each other to construct the MCCDD in its entirety (see operation S258), after which mechanical configuration, the user may proceed to use the configured MCCDD for the planned use (see operation S259). Alternatively and/or additionally, the mechanical configuration may take other forms, such as folding, flexing or rolling a display device, which may be unitary or constructed of multiple piece parts. A foldable display device embodiment will be discussed, below, in connection with FIGS. 6A to 6C.

Figure 4C:
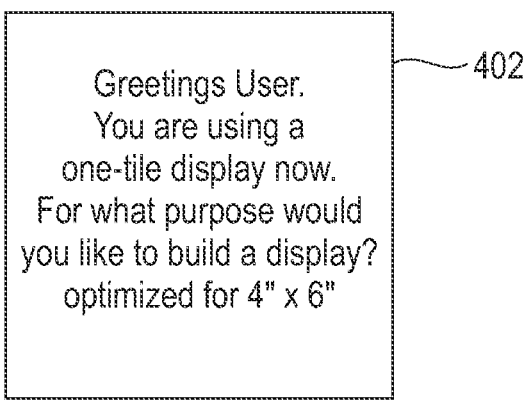
Figure 4D:
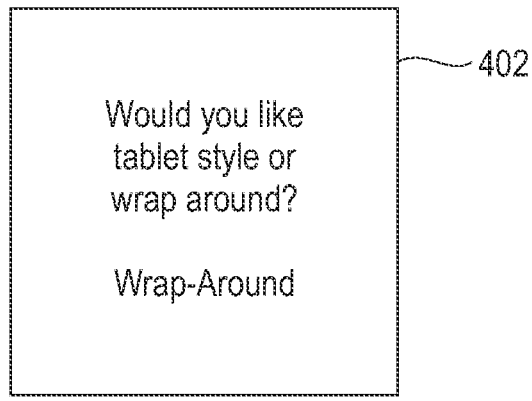
Figure 4E:
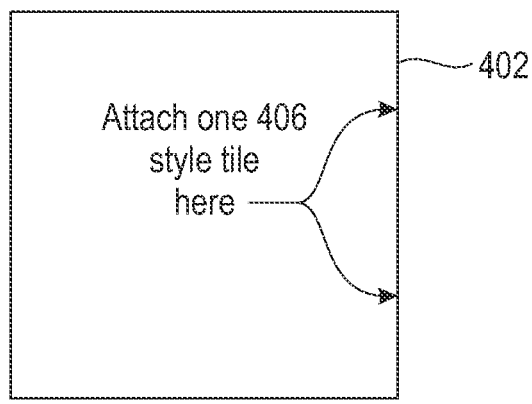
Figure 4F:
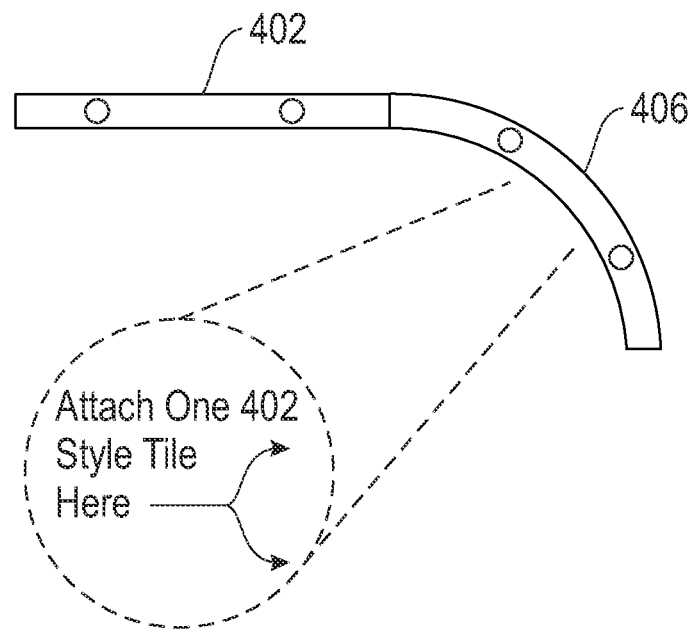
Figure 4G:
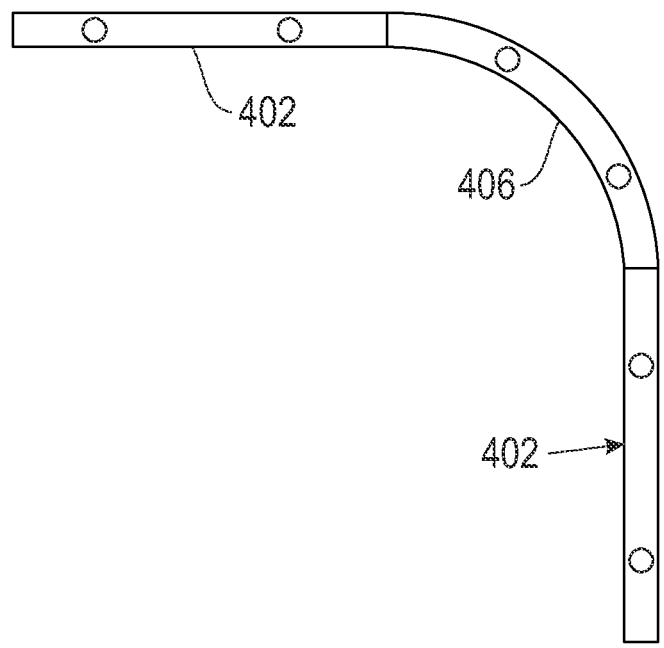

FIGS. 4C and 4D shows an exchange between the user of client computer 106 and its user to get the data needed to indicate the size and shape of the planned display. This information is used to make the display characteristics data set that the client computer sent to instructional server subsystem at operation S255.

Figure 4H:
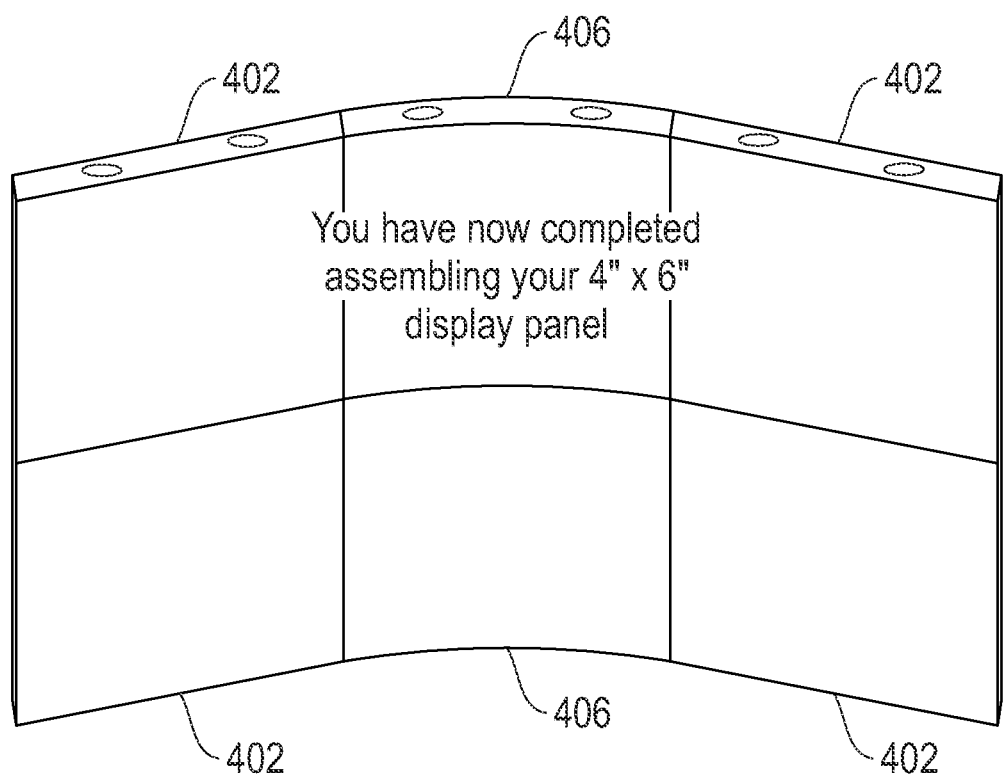

FIGS. 4E, 4F, 4G and 4H show how, in this particular example, the mechanical configuration instructions for making the optimal mechanical configuration are communicated to the user. In FIG. 4H shows the optimal configuration 401 for this example, which is a self-standing display suitable for displaying 4 inch by 6 inch documents at full size. Alternatively, similar instructions can be provided for folding, flexible and/or rolled display devices. Optimal configuration 401 has a single, contiguous display surface. Alternatively, some optimally configured display surfaces may have multiple non-contiguous portions, as further discussed, below, in connection with FIGS. 6A to 6C.

The foregoing method of flowchart 250 shows how software can be used to provide mechanical configuration instructions for an MCCDDs to a user. Alternatively or additionally: (i) some embodiments may determine which computer programs (for example, apps in an app store) are compatible with various MCCDDs in various mechanical configurations; and/or (ii) some embodiments may determine which content objects (that is, pieces of text and/or images) can be displayed at the same time by various MCCDDs in various mechanical configurations.

III. FURTHER COMMENTS AND/OR EMBODIMENTS

Some embodiments of the present invention recognize the following facts, potential problems and/or potential areas for improvement with respect to the current state of the art: (i) foldable display devices have already become popular; (ii) a foldable display device (FDD) can have multiple folding capabilities; (iii) when the user does not have to interact with the foldable mobile device, the device is generally kept in a fully folded configuration; (iv) in order to use the folded mobile device, the user has to unfold the device; (v) users can interact with different contents using foldable mobile devices; (vi) for each content, it is not required that the user has to unfold the device completely; (vii) by partially unfolding the device, the user can interact with the content; and/or (viii) for different contents, the user has to unfold the device completely to interact with the FDD's contents.

Some embodiments of the present invention recognize the following facts, potential problems and/or potential areas for improvement with respect to the current state of the art: (i) when a user receives different types of contents in a foldable mobile device, different areas of display surface will be visible to the user; (ii) the visible areas of the display surface depend on the different opening angle and folding configuration of the foldable display; (iii) different types of content need different amounts of display area; and/or (iv) what is needed is a method to dynamically filter the content based on the opening angle and unfolding pattern of the foldable device.

Some embodiments of the present invention may include one, or more, of the following operations, features, characteristics and/or advantages: (i) an FDD identifies the unfolding angle and unfolding pattern (that is, the "folding configuration") of the FDD; (ii) machine logic (for example, software running on the FDD itself) identifies, based on the folding configuration: (a) which contents are to be filtered, (b) which apps will be shown, and/or (c) what should the user interface be; and/or (iv) at the same time, for any received content, the system will recommend the folding angle or unfolding pattern.

Some embodiments of the present invention may include one, or more, of the following operations, features, characteristics and/or advantages: (i) based on the identified unfolding angle and the unfolding pattern, the system will identify which contents or apps will be shown on the display; and/or (ii) for any notification, the system will recommend the unfolding angle/pattern to be used.

Some embodiments of the present invention may include one, or more, of the following operations, features, characteristics and/or advantages: (i) based on historical interaction with foldable display devices, the foldable display device will identify the unfolding angle and unfolding pattern of the foldable display device; (ii) accordingly, the foldable display device will dynamically be filtering appropriate content which can be shown comfortably with said unfolding angle or unfolding pattern; (iii) based on the unfolding angle and unfolding pattern of the foldable display device, the system will dynamically alter the user interface on the current unfolding state, where the user interface includes mobile apps, orientation of mobile apps, display area management, etc.; (iv) when any content/notification is received (for example, a phone call, video call, and/or a message), the system will be analyzing the content and will identify how the foldable display device needs to be unfolded, where the same will be shown with holographic projection, so that the user can understand how the foldable device is to be opened to interact with the received content; (v) the visual or holographic notification will show how the user should unfold the display device for the received notification content; and/or (vi) the system will also consider the surrounding context, location, user's gripping condition of the mobile device, and current folding state of the mobile device.

Some embodiments of the present invention may include one, or more, of the following operations, features, characteristics and/or advantages: (i) the foldable display device will historically track: (a) how the user is unfolding the mobile device, and/or (b) what types of activities the user is performing (like both reading and typing vs only reading) and accordingly the knowledge corpus will be created to provide the appropriate recommendation on the unfolding pattern of the foldable display device; (ii) the foldable display device will historically learn the users ergonomics to perform various activities with the foldable display device; (iii) historically learn the different unfolding and bending state of the foldable display device, where for any selected activity, the system will recommend how the foldable display device should be unfolded so that the required level of ergonomics can be restored; and/or (iv) upon receiving notification/content, the system will be analyze the content along with previously received unattended/pending/unactioned notifications/contents to derive the optimal unfolding angle/pattern and the same will be shown with holographic projection so that the user can attend to all of these notifications with the comfort of using a single unfolding action.

Figure 5:
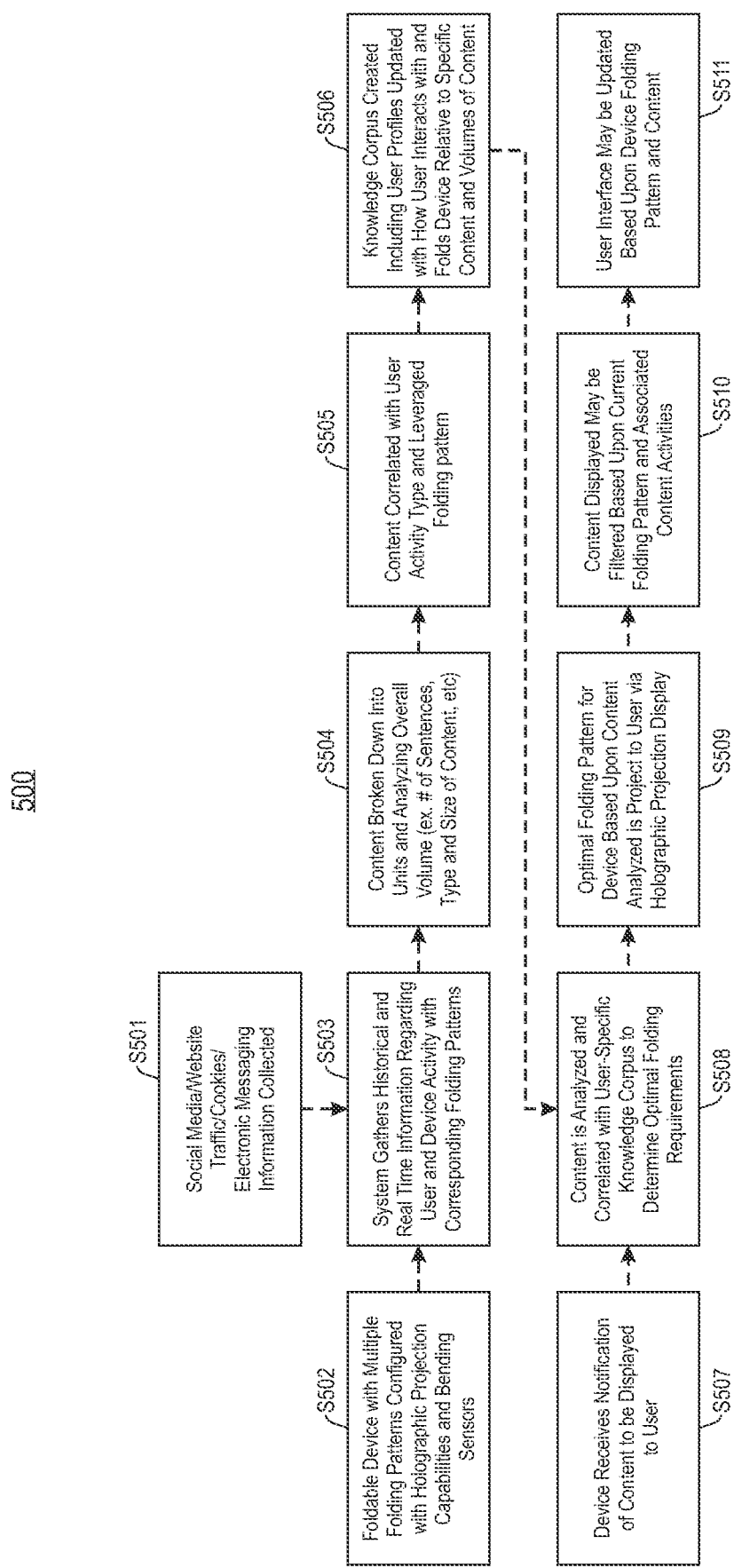
FIG. 5 is a flowchart showing a second embodiment of a method according to the present invention.

As shown in FIG. 5, flowchart 500 represents a method according to the present invention. Flowchart 500 includes the following operation blocks (with process flow between the various operation blocks being as shown by arrows in flowchart 500): S501; S502; S503; S503; S504; S505; S506; S507; S508; S509; S510; and S511.

Figure 6A:
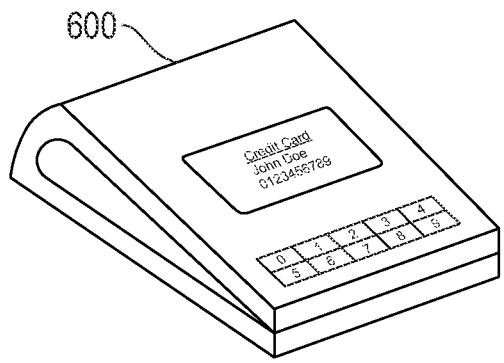
FIGS. 6A to 6C each show a perspective view of a foldable display device ("FDD") as it is folded from a first fold configuration to a second fold configuration.
Figure 6B:
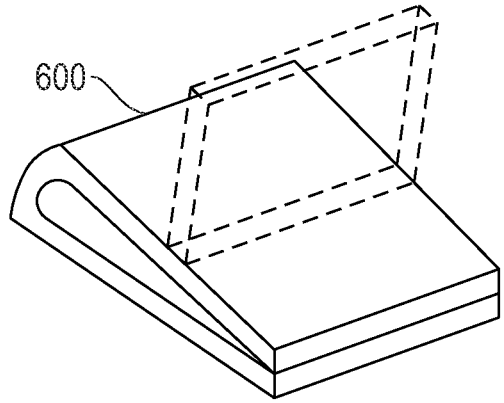
Figure 6C:
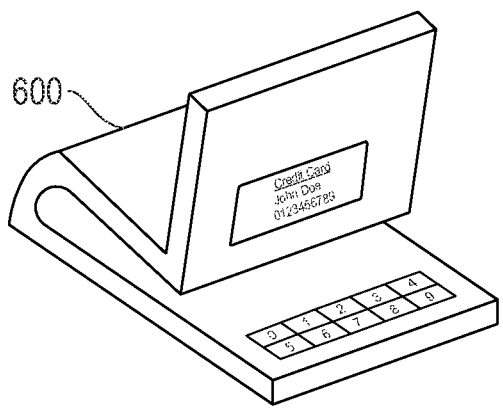

As shown in FIGS. 6A, 6B, and 6C, respectively show a foldable type mechanically configurable computer display device (MCCDD) 600 in three configurations as follows: (i) a first configuration where the entire display area is contiguous; (ii) a second configuration that is a transitional configuration between the first configuration and a third configuration; and (iii) the third configuration that includes a first portion and a second portion that are non-contiguous with respect to each other.

A method according to an embodiment of the present invention includes the following operations (not necessarily in the following order): (i) a foldable display device can have a fixed folding position, or folding can be done anywhere on the display; (ii) multiple folding can be created on the foldable display device, and a different unfolding pattern will create a different shape of the foldable display device; (iii) the foldable display device will have an array of bending sensors, and based on the sensor feed, the foldable display device can identify the folding pattern of the foldable display device; (iv) as per some embodiments of the present invention, the folded surface of the foldable display device will have one or more or an array of holographic projection capabilities; (v) historically, the foldable display device will be tracking what types of contents are navigated by using the folding pattern of the foldable display device; (vi) the system will track the content volume, the number of sentences, the types of contents (such as text versus video versus image, etc.); (vii) based on the content dimension, the system will identify the unfolding condition of the foldable mobile device; (viii) the system will track how the user is performing actions on the foldable display device in different folding conditions/states; (ix) the action can be typing, reading only, browsing folders, etc. while interacting with the foldable display device; and (x) the system will also track the types of content and content volume with different unfolding conditions of the mobile device.

A method according to an embodiment of the present invention includes the following operations (not necessarily in the following order): (i) based on the gathered historical data, the system will identify how the user in unfolding the device, including unfolding angles, types of activities the user is performing, types and volume of contents, etc.; (ii) based on historically captured data, the system will create a knowledge corpus to find how the mobile device is to be unfolded; (iii) the system will identify the properties of each of the apps, and will track what types of apps are interacted with different unfolded conditions; (iv) the system will identify the different folding conditions based on the mobile phone and the selection of mobile app; (v) if the user performs any folding pattern with the foldable mobile device, then the system will use a knowledge corpus to identify what types of contents are interacted with the said unfolding pattern; (vi) the system will filter the contents based on the unfolding condition; (vii) the system will create the appropriate user interface based on the current unfolding condition; (viii) based on the selection of the appropriate unfolding pattern, the system will be using a knowledge corpus to identify how the user interface is to be created; (ix) when the user receives a notification, or any activity is to be performed with the foldable mobile device, then the system will analyze the content, the types of activity the user has to perform, and the same will be used for identifying how the foldable device is to be unfolded; (x) if there are previous notifications which have not been attended to by the user, the system will consider that also so that the user can act on those pending notifications as well; and (xi) the system will use the holographic capability to show how the foldable device is to be unfolded and the same will be shown with a holographic image, where the user can follow the exact unfolding pattern.

A method according to an embodiment of the present invention for dynamically determining an unfolding pattern and unfolding angles for one or more foldable components of a foldable display device, includes the following operations (not necessarily in the following order): (i) determining the unfolding pattern and unfolding angles for the one or more foldable components of the foldable display device based, at least in part, on: (a) historical folding patterns and folding angles associated with the one or more foldable components of the foldable display device, (b) historical folding patterns and folding angles associated with particular user interfaces displayed on the one or more foldable components of the foldable display device, (c) a surrounding context of a user holding the foldable display device, (d) a user's historical ergonomic activity with respect to the one or more foldable components of the foldable display device, (e) a number and types of user interfaces to be displayed on the one or more foldable components of the foldable display device, and (f) historical user interaction data associated with the number and types of user interfaces to be displayed on the one or more foldable components of the foldable display device; (ii) projecting holographic images and/or videos from the foldable display device, wherein the projected holographic images and/or videos provide instructions on how to unfold the foldable display device to arrive at the determined unfolding pattern and unfolding angles for the one or more foldable components; and (iii) dynamically altering the folding pattern and folding angles associated with the one or more foldable components of the foldable display device based on a change in the surrounding context of the user, the user's ergonomic activity with respect to the foldable display device, a number and a type of user interfaces to be displayed, and the types of user interactions that the user needs to perform with the user interfaces to be displayed.

Some embodiments of the present invention may include one, or more, of the following operations, features, characteristics and/or advantages: (i) identifies the unfolding angle and pattern to display the content appropriately to the user; (ii) the system learns using the patterns and historical user behavior to alter the user interface based on: (a) the angle and pattern, (b) on the analysis of the user activity, (c) the surrounding contextual setting, and/or (d) the incoming content/notification; (iii) the system will also show the holographic notification to the user to guide the user on how to unfold the device based on the surrounding contextual settings; and/or (iv) provides a method to display an application in a foldable housing.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a display characteristics data set including information indicative of a size and shape of a planned display that is planned to be displayed to a user through a mechanically configurable computer display device (MCCDD);
determining, by machine logic, an optimal mechanical configuration for the MCCDD based upon the display characteristics data set, with the optimal mechanical configuration involving at least one folding operation of at least one part of the MCCDD; and
communicating, to the user, configuration instructions for configuring the MCCDD into the optimal mechanical configuration.

2. The CIM of claim 1 further comprising mechanically configuring, by the user, the MCCDD into the optimal mechanical configuration.

3. The CIM of claim 2 further comprising displaying the planned display on the MCCDD.

4. The CIM of claim 1 wherein the display characteristics data set indicates the size and shape of the planned display based on a computer program that is planned to be run.

5. The CIM of claim 1 wherein the display characteristics data set indicates the size and shape of the planned display based on content that is planned to be displayed.

6. The CIM of claim 1 wherein:
the configuration instructions include instructions for performing at least one folding and/or unfolding operation while configuring the MCCDD.

7. A computer program product (CPP) comprising:
a set of storage device(s); and
computer code stored collectively in the set of storage device(s), with the computer code including data and instructions to cause a processor(s) set to perform at least the following operations:
receiving a display characteristics data set including information indicative of a size and shape of a planned display that is planned to be displayed to a user through a mechanically configurable computer display device (MCCDD),
determining, by machine logic, an optimal mechanical configuration for the MCCDD based upon the display characteristics data set, with the optimal mechanical configuration involving at least one folding operation of at least one part of the MCCDD, and
communicating, to the user, configuration instructions for configuring the MCCDD into the optimal mechanical configuration.

8. The CPP of claim 7 wherein the computer code further includes instructions for causing the processor(s) set to perform the following operation(s): mechanically configuring, by the user, the MCCDD into the optimal mechanical configuration.

9. The CPP of claim 8 wherein the computer code further includes instructions for causing the processor(s) set to perform the following operation(s): displaying the planned display on the MCCDD.

10. The CPP of claim 7 wherein the display characteristics data set indicates the size and shape of the planned display based on a computer program that is planned to be run.

11. The CPP of claim 7 wherein the display characteristics data set indicates the size and shape of the planned display based on content that is planned to be displayed.

12. The CPP of claim 7 wherein:
the configuration instructions include instructions for performing at least one folding and/or unfolding operation while configuring the MCCDD.

13. A computer system (CS) comprising:
a processor(s) set;
a set of storage device(s); and
computer code stored collectively in the set of storage device(s), with the computer code including data and instructions to cause the processor(s) set to perform at least the following operations:
receiving a display characteristics data set including information indicative of a size and shape of a planned display that is planned to be displayed to a user through a mechanically configurable computer display device (MCCDD),
determining, by machine logic, an optimal mechanical configuration for the MCCDD based upon the display characteristics data set, with the optimal mechanical configuration involving at least one folding operation of at least one part of the MCCDD, and
communicating, to the user, configuration instructions for configuring the MCCDD into the optimal mechanical configuration.

14. The CS of claim 13 wherein the computer code further includes instructions for causing the processor(s) set to perform the following operation(s): mechanically configuring, by the user, the MCCDD into the optimal mechanical configuration.

15. The CS of claim 14 wherein the computer code further includes instructions for causing the processor(s) set to perform the following operation(s): displaying the planned display on the MCCDD.

16. The CS of claim 13 wherein the display characteristics data set indicates the size and shape of the planned display based on a computer program that is planned to be run.

17. The CS of claim 13 wherein the display characteristics data set indicates the size and shape of the planned display based on content that is planned to be displayed.

18. The CS of claim 13 wherein:
the configuration instructions include instructions for performing at least one folding and/or unfolding operation while configuring the MCCDD.

* * * * *